May 10, 1960     M. LA MARCHE     2,936,105
DISPOSABLE WASTE CONTAINER FOR AUTOMOBILES
Filed Nov. 13, 1956
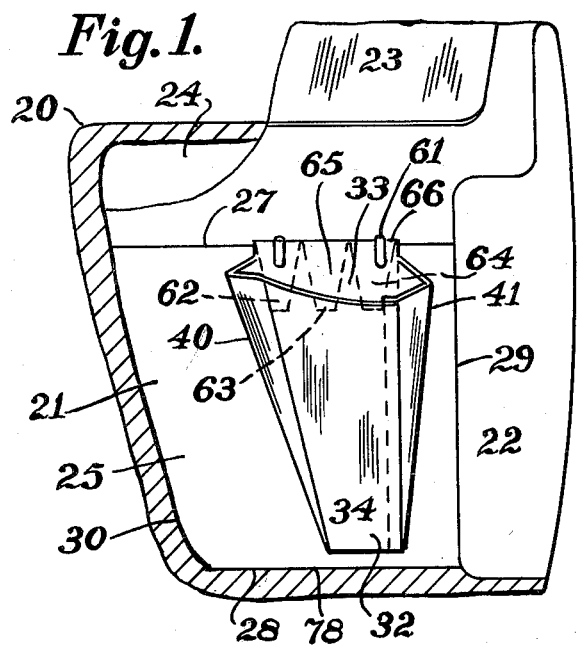
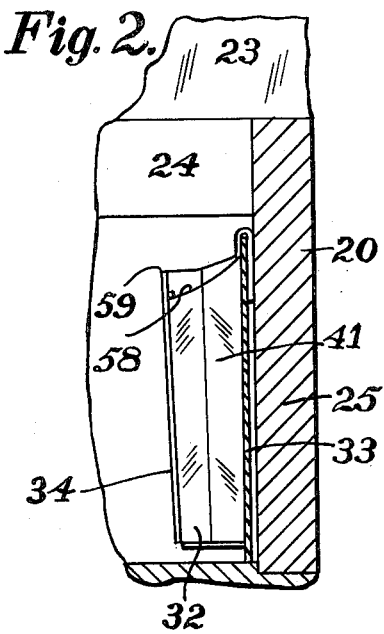
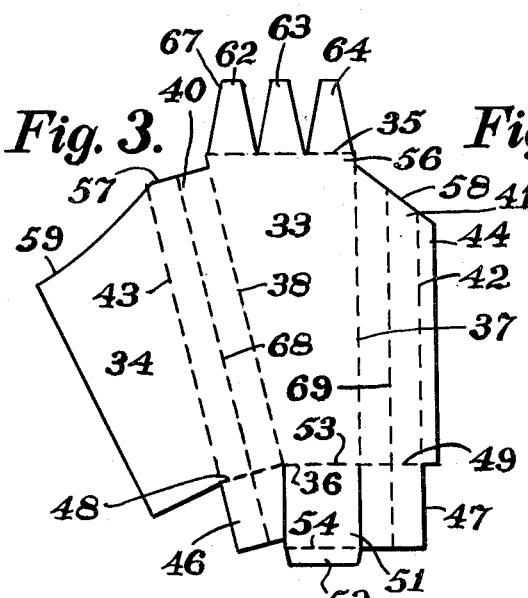
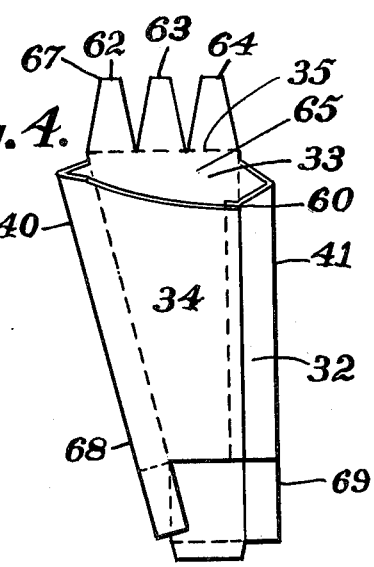
INVENTOR.
*MARCEL LAMARCHE*
BY
Pearson + Pearson
*ATTORNEYS*

United States Patent Office 2,936,105
Patented May 10, 1960

2,936,105

DISPOSABLE WASTE CONTAINER FOR AUTOMOBILES

Marcel La Marche, Manchester, N.H.

Application November 13, 1956, Serial No. 621,727

3 Claims. (Cl. 229—53)

This invention relates to waste containers for use in automobiles.

Automobiles have long included built-in ash trays for receiving cigarette ashes and detachable ash trays, such as shown in U.S. Patent No. 1,746,634 to Breneman of February 11, 1930, have been proposed for hanging on the window ledge of an automobile. A conical holder for umbrellas permanently affixed to a toe pad of an automobile is proposed in U.S. Patent No. 2,426,113 to Northcutt of August 19, 1947.

The device of this invention is designed to receive waste and to be carried on the toe pad of an automobile but it is detachably mounted, made of disposable sheet material and shaped to receive all types of trash rather than merely ashes.

The principal object of the invention is to provide a waste container for use in automobiles which is easily formed from one piece of sheet material such as paperboard and can be thrown away with the contents as a disposable item.

Another object of the invention is to provide an automobile waste container shaped to conform to the shape of an automobile toe pad and arranged to be hooked thereover in depending position.

A further object of the invention is to provide a disposable waste container having semi rigid wall panels and of considerable size which container is collapsible into flat condition for storage or shipment and easily erected for use in an automobile.

Still another object of the invention is to provide a disposable waste container adapted to be suspended on the toe pad of an automobile near the feet of a passenger, the container being flexible in the upper portion thereof to absorb impacts which might normally dislodge the same from the pad.

A still further object of the invention is to provide a collapsible, disposable, paper waste container for automobiles which can be made at low cost on high speed folding and glueing machinery and may be purchased in quantity by the consumer or given away as a premium to the consumer.

Other objects and advantages of this invention will be apparent from the claims, the description of the drawings and from the drawings in which a specific embodiment is illustrated.

Fig. 1 is a side elevation of the inside of the driver's compartment of a typical automobile showing the waste container of this invention mounted on the toe pad.

Fig. 2 is an end view, in section, of the device shown in Fig. 1.

Fig. 3 is a plan view of the blank from which the container is made.

Fig. 4 is a front view of the device in collapsed form, and

Fig. 5 is a fragmentary view similar to Fig. 1 showing a modified form of attachment flaps.

In the drawing 20 represents a typical automobile having a driver's compartment 21, a door 22, a windshield 23, a dash 24 and a toe pad 25. Toe pad 25 is polygonal in shape and varies in size and outline from year to year and model to model. However, in nearly all present day automobiles, the toe pad 25 includes upper and lower parallel horizontal edges 27 and 28, a vertical rearward edge 29 and a partially, inclined forward edge such as at 30.

The waste container 32 of this invention comprises a unitary body of self supporting, semi rigid, disposable sheet material such as paperboard and includes a pair of parallel side walls 33 and 34 substantially conforming in outline to the polygonal outline of toe pad 25. When in erected and mounted position, each side wall 33 or 34 of container 32 includes a pair of generally horizontal upper and lower edges 35 and 36, a vertical rearward edge 37 and an inclined forward edge 38. A pair of rectangular end walls 40 and 41 foldably connect the side walls 33 and 34 along edges 37 and 38, which are crease lines, and along crease lines 42 and 43, there being a glue lap 44 for adhering to side wall 34. Each end wall 40 and 41 includes a dust flap 46 and 47 along the lower edge thereof, foldably connected thereto by crease lines 48 or 49. A cover flap 51 and a cover tuck flap 52 are foldably connected to the lower edge of a side wall such as 33 by crease lines 53 and 54.

Sidewall 33 is of greater height than side wall 34 and end walls 40 and 41, by reason of an upward extension 56 terminating in the horizontal upper edge 35 which is defined by a crease line. The crease line at 35 is thus above the level of the upper edges 57 of end wall 40, 58 of end wall 41 and 59 of side wall 34. In addition the upper edge 58 of wall 41 and the upper edge 59 of wall 34 are tapered downwardly from the adjacent walls 33 and 40 respectively to a common corner meeting point at 60. As best shown in Fig. 1 the erected container 32 thus has an upper opening 65 well below the upper edge 27 of toe pad 25 and capable of receiving trash without interference by the dash 24.

A plurality of spaced apart attachment flaps 62, 63 and 64 are hingedly connected along line 35 to the upward extension 56, each preferably being of truncated triangle form and independently overfoldable outwardly to overlie the side wall 33. In the majority of present day automobiles the container 32, when erected, may be suspended from the toe pad by inserting all of the flaps 62, 63 and 64 over the upper edge 27 and down behind the toe pad, thus supporting the container 32 in depending position. However, in some vehicles the toe pads are convexed slightly or the upper edge such as 27 is obstructed, or of less extent than the upper edge 35 of container 32. In such case one attachment flap such as 62 may be easily torn off leaving the remaining flaps to support the container. Preferably a large sized paper clip 61 of a well known type is slid over each downturned flap such as 63 or 64 to assist in holding the same in position, as shown at 66. The truncated triangle outline of the attachment flaps, wherein each flap is tapered and converges toward a terminal tip such as 67 enables the tip to be easily inserted down behind the toe pad and to fit between any existing toe pad fasteners.

Each end wall 40 and 41 and its dust flap 46 and 47 are centrally and longitudinally creased along lines 68 and 69 as shown in Fig. 3 to form an accordion plait when the container is erected. The blank of Fig. 3 may be folded and glued on high speed, untimed, folding machines when advanced parallel to the glue lap 44. It is folded into collapsed form shown in Fig. 4 with the glue lap 44 adhered to the side wall 34, the end walls 40 and 41 folded in half and the side walls 33 and 34 overlying each other. In this condition it may be stored and shipped. When ready for use the walls are erected, the dust flaps 46 and 47 infolded and the tuck flap 52 of cover flap 51 inserted against wall 34 to hold the lower portion of the container in erected position. The upper portion, however, as shown in the drawings does not entirely erect and the upper portion of end walls 40 and 41 contain a permanent slight outfold. This is advantageous in that the container 32 may be accidentally struck by the legs or feet of a passenger in the automobile and will absorb the impact resiliently by simply flattening out further and then rebounding to normal position.

A modified form of attachment flap is shown in Fig. 5 wherein a container 70, similar to container 32, is shown being in the form of an integral hook. Instead of folding the flaps such as 71, it is only necessary to insert the hooked portion 75 behind the toe pad and slightly distort the shank such as 76.

Preferably the containers such as 32 or 70 are placed in the automobile with the bottom, or cover, flap 51 resting on the floor 78 of the automobile. The attachment flaps such as 62 may then be bent outwardly along line 35, or along an intermediate lateral line if a better fit is so secured, and the tips 67 inserted down behind the upper portion of the toe pad 25. Paper clips 61, such as shown at 66 in Fig. 1, or other well known types of clamps, may be used if desired, but are not essential. Upon becoming filled, the container 32 may be removed for emptying or discard and, since it is made of low cost paper board or the like, its use involves little expense and considerable convenience.

I claim:

1. A collapsible, disposable, waste container for automobiles, said container comprising a unitary body of self supporting, semi rigid, disposable sheet material having a pair of parallel side walls of elongated polygonal outline; a pair of end walls, foldably connecting said side walls, each said end wall including one of a pair of lower dust flaps and each said end wall and its dust flap being longitudinally, centrally creased for forming an accordion plait in the upper portion of said container when erected, said walls when erected forming a collapsible tube of rectangular cross section with an upper and lower end opening; an uncreased cover flap, having a tuck flap, hingedly connected to the bottom of one of said side walls for closing the lower opening of said container and maintaining the lower portion of said container in full erected condition, an upward extension on one of said side walls terminating in a crease line above the level of the other walls of said container and a plurality of spaced apart, individual, attachment flaps hingedly connected at the crease line of said extension, each said flap being independently overfoldable outwardly to overlie the outside of said side wall and form foldable hooked suspension means for said container.

2. A container as specified in claim 1 wherein each said attachment flap is tapered and converges toward the terminal tip thereof.

3. A container as specified in claim 1 wherein the upper edge of one end wall and the upper edge of the unextended side wall of said container each taper downwardly from the adjacent wall to a common corner meeting point, whereby said upper opening is accessible from the side of said container as well as from above said container.

References Cited in the file of this patent

UNITED STATES PATENTS

| | | |
|---|---|---|
| 1,746,634 | Breneman | Feb. 11, 1930 |
| 1,945,099 | Trestrail | Jan. 30, 1934 |
| 2,127,631 | Nagle | Aug. 23, 1938 |
| 2,362,595 | Torrison | Nov. 14, 1944 |
| 2,735,597 | Treleven | Feb. 21, 1956 |
| 2,778,554 | Porkola | Jan. 22, 1957 |
| 2,796,067 | McCutcheon et al. | June 18, 1957 |